US 8,082,088 B2

(12) United States Patent
Olsson (10) Patent No.: US 8,082,088 B2
(45) Date of Patent: Dec. 20, 2011

(54) METHOD FOR CONTROLLING ROTATION SPEED

(75) Inventor: Karl Erik Olsson, Stora Sundby (SE)

(73) Assignee: Volvo Construction Equipment AB, Estalstuna (SE)

( * ) Notice: Subject to any disclaimer, the term of this patent is extended or adjusted under 35 U.S.C. 154(b) by 907 days.

(21) Appl. No.: 12/065,511

(22) PCT Filed: Sep. 20, 2005

(86) PCT No.: PCT/SE2005/001375
§ 371 (c)(1),
(2), (4) Date: Mar. 3, 2008

(87) PCT Pub. No.: WO2007/035136
PCT Pub. Date: Mar. 29, 2007

(65) Prior Publication Data
US 2008/0221771 A1    Sep. 11, 2008

(51) Int. Cl.
*B60K 1/00* (2006.01)
(52) U.S. Cl. .......................... 701/83; 701/82
(58) Field of Classification Search .......... 701/82, 701/83
See application file for complete search history.

(56) References Cited

U.S. PATENT DOCUMENTS

| | | | | |
|---|---|---|---|---|
| 4,973,295 | A * | 11/1990 | Lee | 475/153 |
| 5,017,183 | A * | 5/1991 | Teraoka | 475/150 |
| 5,927,421 | A * | 7/1999 | Fukada | 180/197 |
| 6,154,702 | A * | 11/2000 | Fodor et al. | 701/71 |
| 6,584,398 | B1 * | 6/2003 | Erban | 701/82 |
| 2002/0002433 | A1 * | 1/2002 | Matsuno | 701/67 |
| 2003/0221889 | A1 * | 12/2003 | Sauter | 180/197 |
| 2005/0027425 | A1 * | 2/2005 | Wang | 701/70 |
| 2005/0027427 | A1 * | 2/2005 | Nagaya et al. | 701/84 |
| 2005/0109549 | A1 * | 5/2005 | Morrow | 180/65.2 |

FOREIGN PATENT DOCUMENTS

| | | |
|---|---|---|
| DE | 10113103 A1 | 9/2002 |
| DE | 4042581 B4 | 4/2005 |
| EP | 1477705 A1 | 11/2004 |
| GB | 2204368 A | 11/1988 |
| WO | 03006846 A1 | 1/2003 |

OTHER PUBLICATIONS

International Search Report for corresponding International Application PCT/SE2005/001375.
Supplementary European Search Report for corresponding European App. EP 05 78 6159.
Supplementary European Search Report for corresponding European App. EP 06 71 6897.
Supplementary European Search Report for corresponding European App. EP 06 71 6898.

* cited by examiner

*Primary Examiner* — Joanne Silbermann
*Assistant Examiner* — Michael Stabley
(74) *Attorney, Agent, or Firm* — WRB-IP LLP (57) ABSTRACT

A method for controlling the rotational speed of at least one rotating element in a vehicle's drive line is provided. A first control model and a second control model are defined. The first control model calculates a permitted slippage of at least one of the vehicle's ground-engaging elements at its point of contact with the ground, which ground-engaging element is driven via the rotating element. The second control model calculates a torque delivered to the said ground-engaging element. The result of one of the said control models is utilized for controlling the rotational speed of the rotating element.

29 Claims, 7 Drawing Sheets

METHOD FOR CONTROLLING ROTATION SPEED

BACKGROUND AND SUMMARY

The present invention relates to a method for controlling the rotational speed of a rotating element in the drive line of a vehicle.

By the term "rotating element" is meant a shaft, such as a longitudinal drive shaft (for example universal drive shaft) or transverse drive shaft (that is wheel axle) or other element that is arranged to rotate and is comprised in the drive line for the transmission of power.

By the term "drive line" is meant the whole power-transmission system from the vehicle's motor to its ground-engaging elements. The drive line thus comprises clutch, gearbox (and any distribution gearbox), universal drive shaft (or universal drive shafts), transverse drive shafts, etc. Hydraulic, electrical and other driving systems are also included within the term "drive line".

The term "ground-engaging elements" includes wheels, caterpillar tracks, etc.

The invention can be implemented on wheeled vehicles, tracked vehicles and vehicles that run on rails. It relates primarily to wheeled vehicles. In addition, the invention can be implemented on cars, goods vehicles, busses and other vehicles that are driven on roads, but is primarily intended for vehicles that are driven over rough ground, such as four-wheel-drive cars and working vehicles, such as articulated haulers, wheel loaders, excavators, etc. The invention is particularly applicable for vehicles with several driven axles and, for the purpose of exemplification, it will be described in the following with reference to an articulated hauler.

A basic problem for all vehicles that are driven with several points of contact with the ground is how the propulsive force is distributed. It is desirable to control the rotational speed of the wheels so that the slippage in the longitudinal direction is the same at all the points of contact with the ground, as this prevents excessive slippage at individual points of contact with the ground. The slippage is the standardized difference between the speed of the wheel at the point of contact with the ground and the speed at which the vehicle is moving relative to the ground at the same point.

One way of achieving the desired similarity in the longitudinal slippage could be to connect the driving of all the wheels mechanically. This would, however, not work when cornering. When cornering, the vehicle moves at different speeds relative to the ground at the different points of contact with the ground. The outer wheels move at a higher speed relative to the ground than the inner wheels, as the outer wheels have to travel a greater distance than the inner wheels in the same period of time. In addition, when cornering, the front wheels move more quickly relative to the ground than the rear wheels.

The problem with distributing the propulsive force in an effective way, even when cornering, is traditionally solved by dividing the torque in a particular, fixed ratio by means of a differential. The rotational speed is then controlled by the speed of the vehicle relative to the ground at the different points of contact with the ground and by the slippage. The slippage cannot, however, be controlled. If the torque ratio in the differential is incorrect for the product of the vertical load and the ground friction, the slippage can increase without limit, the wheels can spin and the total transmitted propulsive force is limited by the point of contact with the ground where the slippage is taking place.

The drawbacks with the uncontrolled slippage are normally countered by various measures for reducing the slippage, for example by the use of a so-called differential lock. The differential lock consists traditionally of a toothed coupling that locks the differential mechanically. The disadvantage of a differential lock is that the speed difference when cornering manifests itself as slippage at the relevant points of contact with the ground. This results in a restricted torque that shortens the life of the drive line, and results in losses and greater tire wear.

WO03/006846 describes a plurality of different drive line solutions which attempt to avoid the abovementioned problems associated with cornering.

It is desirable to achieve a method for controlling the rotational speed of a rotating element in a vehicle's drive line in a way that provides a longer life for the drive line and/or lower losses in the form of fuel consumption and/or tire wear.

According to an aspect of a method for controlling the rotational speed of at least one rotating element in a vehicle's drive line according to the present invention, a first control model and a second control model are defined, in that the first control model calculates a permitted slippage of at least one of the vehicle's ground-engaging elements at its point of contact with the ground, which ground-engaging element is driven via the rotating element, in that the second control model calculates a torque delivered to the said ground-engaging element, and in that the result of one of the said control models is utilized for controlling the rotational speed of the rotating element.

Two different regulating principles are thus available, via the first and the second control models.

In addition, the first control model provides a limitation in permitted slippage and thereby achieves the function of the traditional differential locking. However, a certain rotational speed difference is permitted between the rotating elements that are controlled in relation to each other using the first control model.

When the second control model is used for controlling the rotational speed, the rotational speed of the rotating element is controlled in such a way that a required torque is delivered to the said ground-engaging element and the slippage at the said point of contact with the ground is permitted to vary.

Preferably, one of the said control models is selected on the basis of the vehicle's operating conditions, for controlling the rotational speed of the rotating element. The term "operating conditions" is to be interpreted here in its broadest sense and can include, for example, operating parameters detected on the vehicle, current driving situation/work being carried out, geographical position, environment/weather, etc.

The selection of the control model is preferably carried out repeatedly, either continuously or intermittently, and automatically.

According to a preferred embodiment, the first control model calculates at least one limit for the said permitted slippage and the second control model is utilized for controlling the rotational speed of the rotating element, provided that a slippage at the said point of contact with the ground, calculated using the first control model, lies on the permitted side of the said limit.

According to the first control model, the slippage at the said point of contact with the ground is calculated continuously and when the calculated slippage reaches the said limit, the control of the rotational speed of the rotating element changes from being carried out on the basis of the second control model to being based on the first control model. The first control model has thus priority over the second control model.

According to a preferred embodiment, the first control model is utilized for controlling the rotational speed of the rotating element when the second control model provides a calculated value of the said rotational speed that means that the calculated slippage according to the first control model lies outside the said limit, with the rotational speed of the rotating element being controlled in such a way that it complies with the said limit.

According to a preferred embodiment, when the first control model is utilized, the rotational speed of the rotating element is controlled in such a way that a free rotation of the said ground-engaging element is counteracted and a torque delivered to the said ground-engaging element is allowed to vary.

According to a preferred embodiment, the vehicle's steering angle is detected and is utilized in the first control model for controlling the rotational speed. The steering angle indicates whether the vehicle is cornering and accordingly it is possible to adjust the limit for the slippage corresponding to the degree of cornering.

According to a preferred embodiment, an actual value for the torque delivered to the ground-engaging element is detected, a desired value for the torque delivered to the ground-engaging element is calculated by the said second control model and the torque delivered to the ground-engaging element is controlled in such a way that the actual value approaches the desired value. The second control model is thus carried out according to a feed-back system.

According to a further development of the previous embodiment, a vertical load from the vehicle to the ground at the said point of contact with the ground is determined and is utilized in the said second control model for a calculation of the desired value for the torque. With knowledge of the vertical load, it is possible to control the rotational speed of the rotating element with regard to friction at the point of contact with the ground according to the second control model. An outgoing torque from the vehicle's gearbox is preferably utilized in combination with the vertical load for the calculation of the desired value.

Additional preferred embodiments and advantages of these are apparent from the following description, drawings and claims.

BRIEF DESCRIPTION OF DRAWINGS

The invention will be described in greater detail in the following, with reference to the embodiments that are shown in the attached drawings, in which.

DETAILED DESCRIPTION

Figure 1:
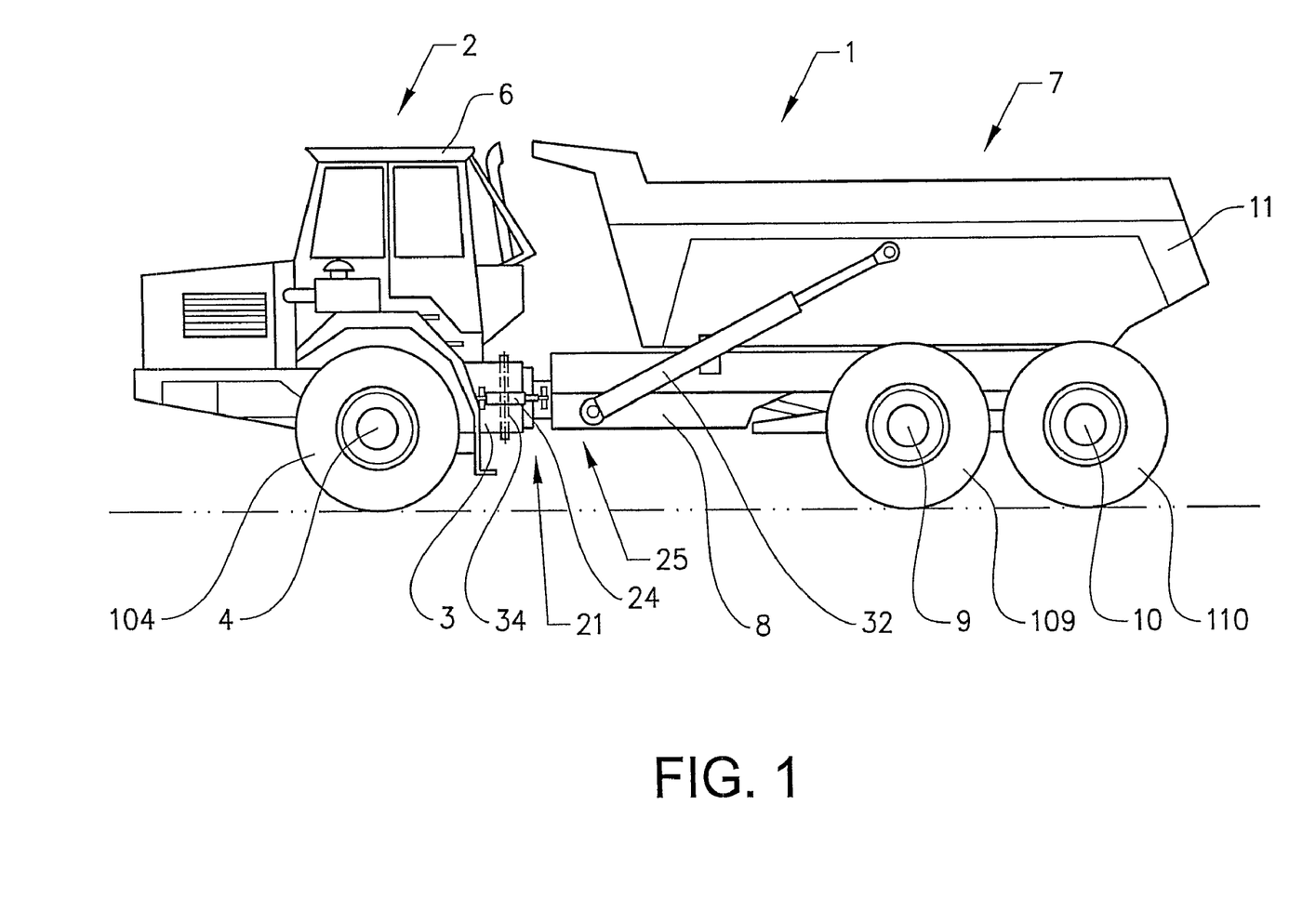
FIG. 1 shows an articulated hauler in a side view.

FIG. 1 shows an articulated hauler 1 in a side view. The articulated hauler comprises a front vehicle section 2 comprising a front frame 3, a front axle 4 and a cab 6 for a driver. The articulated hauler 1 also comprises a rear vehicle section 7 comprising a rear frame 8, a front axle 9, a rear axle 10 and a tipping load container, or platform, 11.

The front and rear axles 9,10 in the rear vehicle section 7 are connected to the rear frame 8 via a bogie arrangement 12, see FIG. 3, and will be referred to below as the front bogie axle 9 and rear bogie axle 10 respectively.

The front axle 4, the front bogie axle 9 and the rear bogie axle 10 each comprise a left ground-engaging element 104, 109,110 and a right ground-engaging element 204,209,210 in the form of wheels.

The front frame 3 is connected to the rear frame 8 via a first pivot joint 21 that allows'the front axle 3 and the rear axle 8 to pivot relative to each other around a vertical pin 34 for steering (turning) the vehicle. A pair of hydraulic cylinders 24 are arranged one on each side of the pivot joint 21 for steering the vehicle. The hydraulic cylinders are controlled by the vehicle driver via a steering wheel and/or a joystick (not shown).

Figure 3:
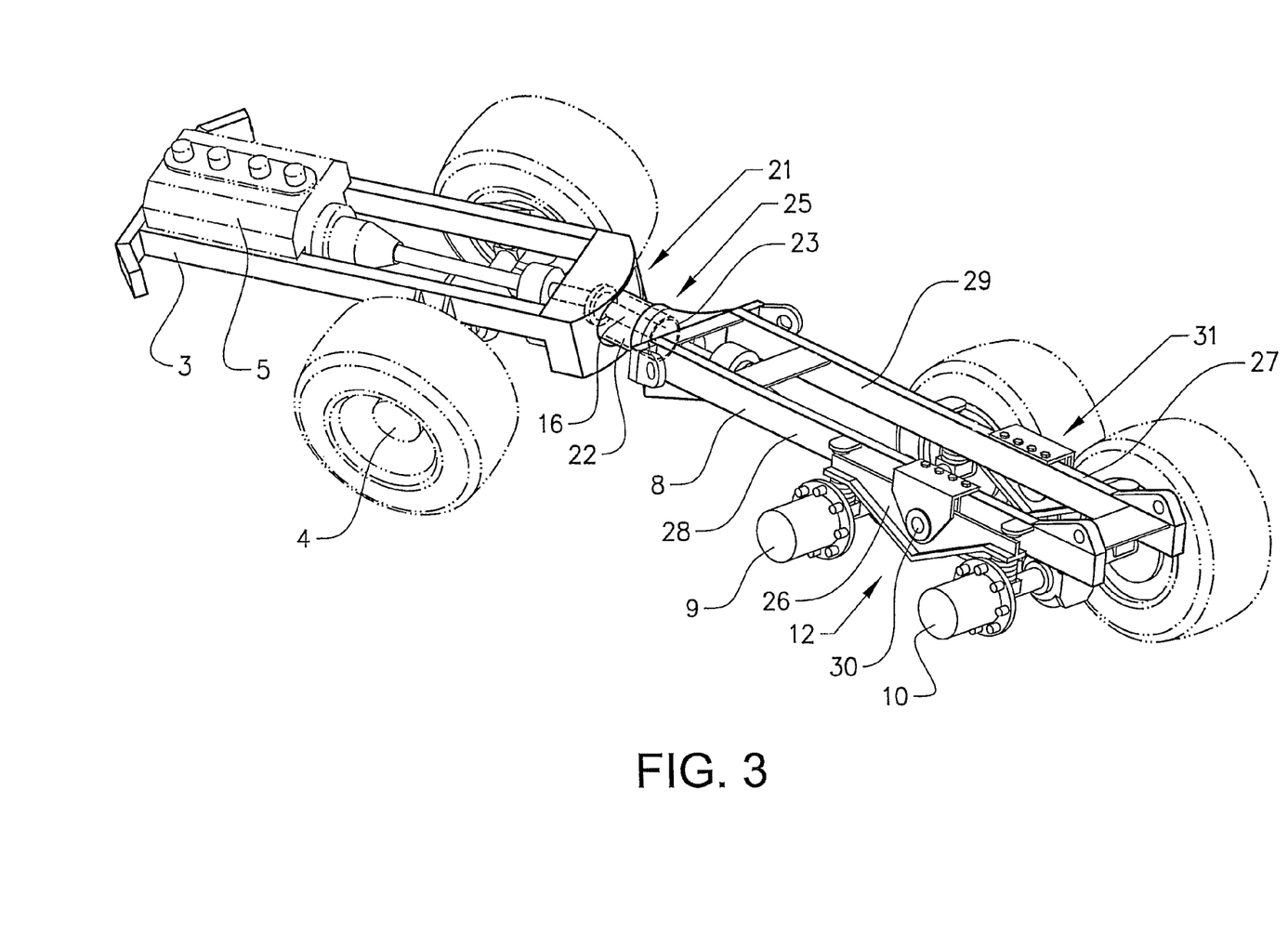
FIG. 3 shows a front and a rear frame in the articulated hauler.

A second pivot joint 25 is arranged to allow the front frame 3 and the rear frame 8 to pivot in relation to each other around an imaginary longitudinal axis, that is an axis that runs in the longitudinal direction of the vehicle 17 see FIG. 3.

Figure 2:
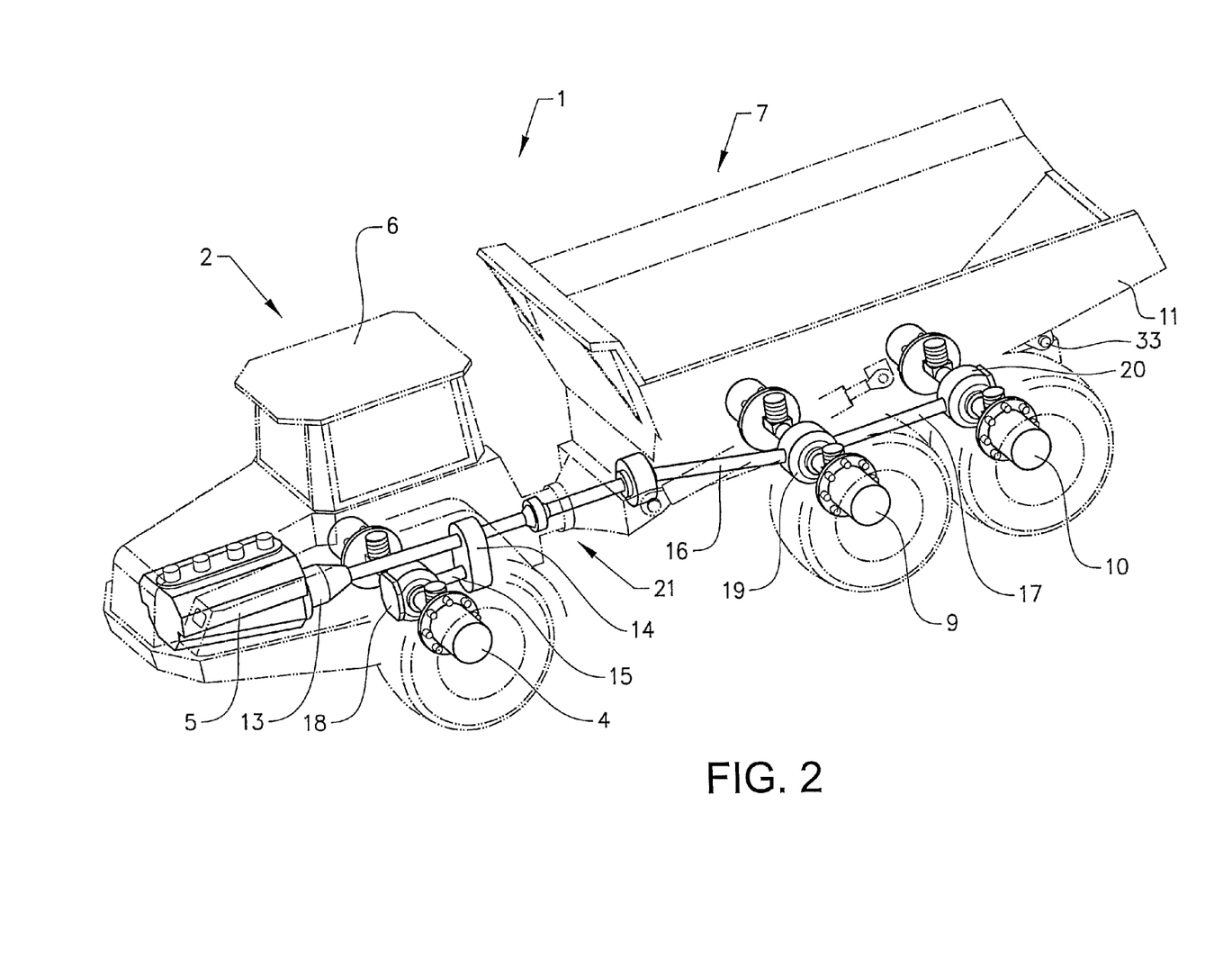
FIG. 2 shows the drive line of the articulated hauler in a partially sectioned perspective view.

The load container 11 is connected to the rear frame 8 via a pivot point 33, see FIG. 2, at a rear part of the rear frame 8. A pair of tipping cylinders 32 are connected at a first end to the rear frame 8 and are connected at a second end to the load container 11. The tipping cylinders 32 are positioned one on each side of the central axis of the vehicle in its longitudinal direction. The load container 11 is thus tipped up in relation to the rear frame 8 upon activation of the tipping cylinders 32.

FIG. 2 shows schematically the drive line of the vehicle 1. A power source in the form of a combustion engine, in this case a diesel engine 5, is arranged for propulsion of the vehicle 1. The drive line comprises a main gearbox 13 in the form of an automatic gearbox, that is operationally connected to an outgoing shaft from the engine 5. The main gearbox 13 has, for example, six forward gears and two reverse gears. The drive line comprises, in addition, an intermediate gearbox 14 for distributing the propulsive force between the front axle 4 and the two bogie axles 9,10.

First, second and third drive shafts 15,16,17 (universal drive shafts) run in the longitudinal direction of the vehicle and are each operationally connected to the distribution gearbox 14 and a differential 18,19,20 in each of wheel axles 4,9,10. A pair of transverse drive shafts (spline axles) run in opposite directions from the respective differential. Each of the transverse drive shafts drives one of the said wheels.

FIG. 3 shows the front frame 3 and the rear frame 8 in greater detail in a perspective view. The second pivot joint 25 comprises two tubular or cylindrical parts 22,23 with shapes that complement each other. The first tubular part 22 is fixed to the front frame 3 and the second tubular part 23 is fixed to the rear frame 8. The first tubular part 22 slides in the second tubular part 23 in such a way that the front frame 3 can pivot in relation to the rear frame 8 around the said longitudinal imaginary axis. The second longitudinal drive shaft 16 runs through the second pivot joint 25.

In FIG. 3, the front frame 3 is in an offset position around the first pivot joint 21 in relation to the rear frame 8. In addition, the front frame 3 is in an offset position around the second pivot joint 25 in relation to the rear frame 8.

The bogie axles 9,10 are suspended in the rear frame 8 via right and left bogie elements 26,27, that run essentially in the longitudinal direction of the vehicle. The bogie elements 26,27 can be rigid, in the form of beams, or slightly flexible in the form of sprung elements, for example leaf springs. Each of the bogie elements 26,27 is arranged along an adjacent longitudinal frame beam 28,29 in the rear frame 8 and is suspended on this via a pivot joint 30,31 in such a way that it can pivot. The pivot joints 30,31 are arranged between the bogie axles 9,10 in the longitudinal direction of the vehicle. The bogie arrangement 12 permits a relative diagonal movement between the bogie elements 26,27, and hence a state in which the bogie elements are positioned with different tilt angles in relation to a horizontal plane.

Figure 4:
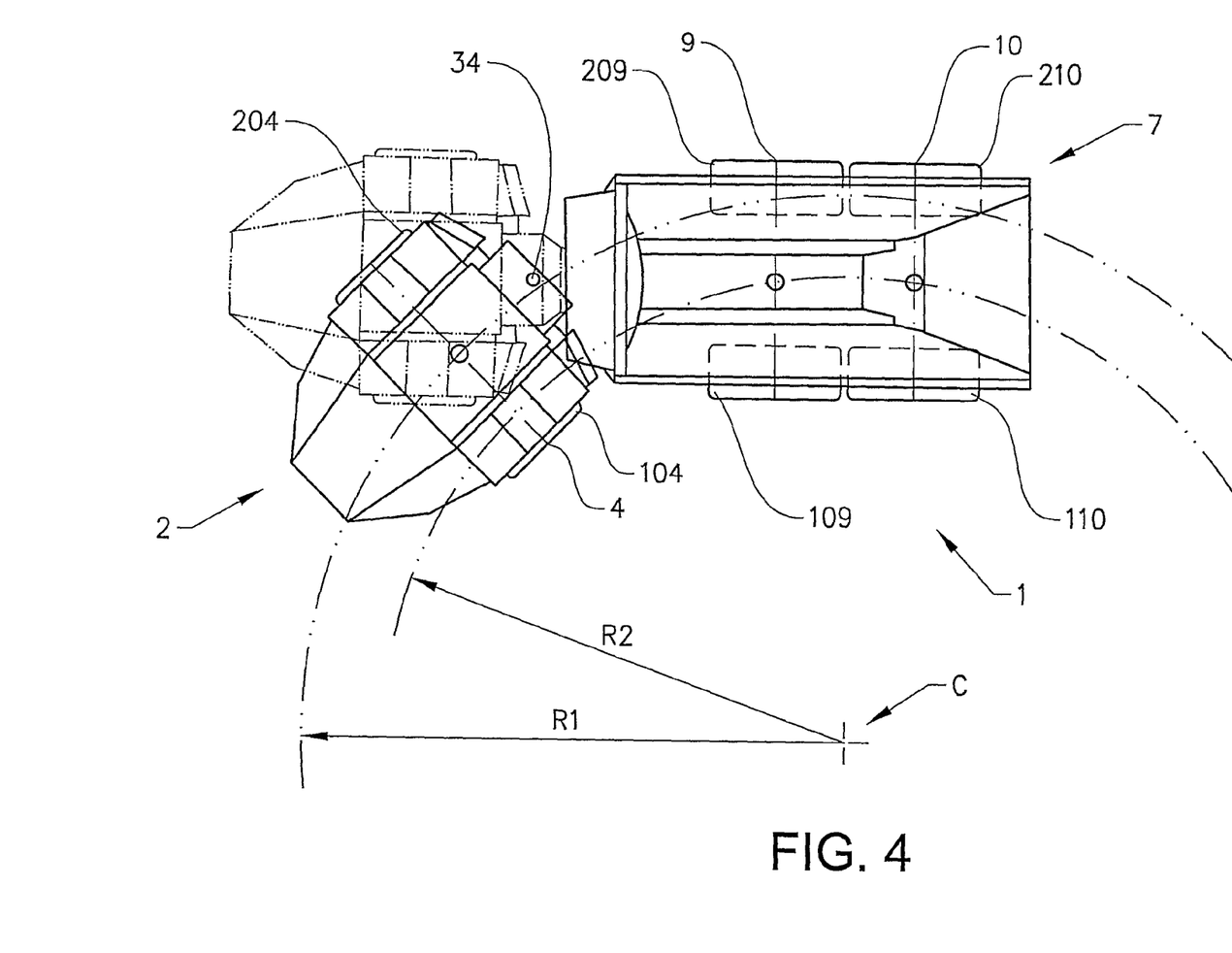
FIG. 4 shows a view from above of the articulated hauler when cornering.

FIG. 4 shows the articulated hauler 1 in a view from above when cornering. The front vehicle section 2 is thus angled in relation to the rear vehicle section 7 around the first pivot joint 21. As the distance between each wheel axle 4,9,10 and a vertical pin 34, that forms the pivot point between the front and rear vehicle sections 2,7, differs greatly, the wheels will follow different radii of curvature when cornering. The front axle 4 will follow the radius of curvature R1 while the bogie axles 9,10 will follow the radius of curvature R2. As the radius of curvature R1 for the front axle 4 is essentially larger than the radius of curvature R2 for the bogie axles 9,10, the wheels 104,204 on the front axle 4 must travel an essentially greater distance than the wheels 109,209 and 110,210 on the two bogie axles 9,10.

In addition, the outer wheels must rotate more quickly than the inner wheels on a bend. The driven wheels must thus rotate at different speeds. In addition, on account of the different radii of curvature for the front axle 4 and the bogie axles 9,10, the front wheels must rotate more quickly than the rear wheels.

In order to prevent these differences from giving rise to any restricted torque in the drive line from the engine 5 to the respective wheel, there is a need to control the rotational speed of the front axle 4 in relation to the bogie axles 9,10 and to control the rotational speed of the inner wheels in relation to the outer wheels when cornering.

Figure 5:
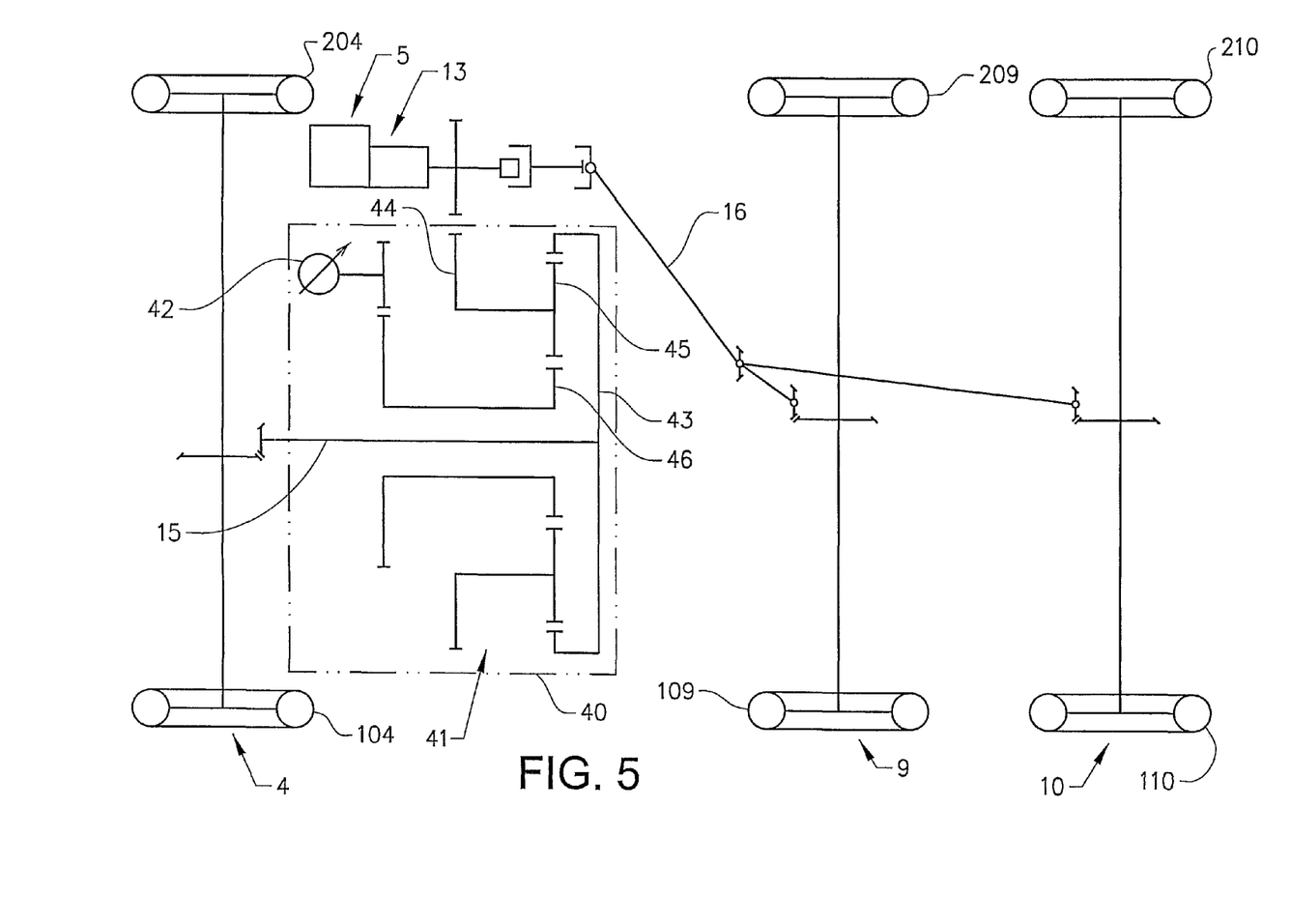
FIG. 5 shows schematically the drive line of the articulated, hauler comprising a control unit for controlling the rotational speed between a front and a rear axle.

FIG. 5 shows schematically the drive line of the articulated hauler 1 according to a first embodiment. A control unit 40 is arranged to control the rotational speed of the front axle 4 in relation to the rotational speed of the bogie axles 9,10. More specifically, the control unit 40 is arranged to control the gearing ratio between the front axle 4 and the bogie axles 9,10. The control unit 40 is arranged to control the rotational speed of a rotating element in the drive line, in the form of the first longitudinal drive shaft 15, in relation to the rotational speed of the second longitudinal drive shaft 16. in other words, only the branch of the drive line that transmits propulsive force to the front axle 4 is controlled.

The control unit 40 comprises a continuously variable transmission 41, that is operationally connected to the first longitudinal drive shaft 15, and a control motor 42. The control motor 42 is operationally connected to the continuously variable transmission 41 to regulate its gearing ratio. A gearing ratio from the diesel engine 5 to the front axle 4 is thus controlled by regulation of the control motor 42.

The continuously variable transmission 41 transfers propulsive force from the engine 5 directly to the front axle 4 without affecting the gearing in a basic mode, suitably when driving straight ahead. The control unit 40 thereby operates with minimal energy losses in the operating situation that is used most frequently. When cornering, the control motor 42 is caused to affect the gearing ratio in the continuously variable transmission 41.

The continuously variable transmission 41 comprises a planetary gear and a ring gear 43 is attached to the first longitudinal drive shaft 15 in such a way that it can rotate. The planetary gear 41 comprises, in addition, a planet wheel carrier 44, at least one planet wheel 45, that is mounted on the planet wheel carrier, and a sun wheel 46. The planet wheels 45 interact with the ring gear 43 and the sun wheel 46 via a cog engagement. The planet carrier 44 is operationally connected to the main gearbox 13 and forms an ingoing power element to the planetary gear 41. The ring gear 43 thus forms an outgoing power element to the front axle 4. The control motor 42 is operationally connected to the sun wheel 46.

The control motor 42 comprises, in this case, a hydraulic motor. A pump in a hydraulic circuit (not shown) provides the hydraulic motor with pressurized hydraulic fluid from a reservoir. The pump is suitably driven by the diesel engine 5 in a conventional way. The control motor 42 is suitably of the type with continuously variable displacement. A control unit is connected electrically to the control motor 42 for controlling the gearing ratio in the planetary gear 41.

The drive line can be said to be divided into several interconnected transmission branches, of which a first transmission branch transfers tractive force to the front axle 4 and a second transmission branch transfers tractive force to the bogie axles 9,10. The control unit 40 is arranged to vary the gearing in the first transmission branch.

A method for controlling the rotational speed of the first longitudinal drive shaft 15 for the purpose of distributing the torque from the diesel engine 5 to the wheels will be described below.

The torque is thus transmitted from the diesel engine 5 to the wheels via the mechanical transmission system that comprises the longitudinal drive shafts 15,16,17 and the transverse drive shafts 4,9,10. The control unit 40 is arranged to affect the distribution of the torque in certain driving situations, such as when cornering. More specifically, the control unit 40 gives an increase in rotational speed to the front axle 4, corresponding to the increase in speed of the front wheels relative to the ground, in relation to the speed of the rear wheels relative to the ground when cornering. The control takes place in relation to a reference rotational speed, suitably the input rotational speed to the control unit 40, that is ∎ operationally connected to the outgoing shaft from the main gearbox 13.

A first control model and a second control model are defined for controlling the rotational speed. The first control model defines a limit for a permitted slippage at one of the vehicle's points of contact with the ground. In this case, the front wheels 104,204 form the point of contact with the ground. The second control model is utilized for control of the rotational speed of the longitudinal drive shaft 15 provided that a slippage at the said point of contact with the ground, that was calculated using the first control model, lies on the permitted side of the said limit. In other words, a theoretical corridor for the slippage is defined using the first control model and the control of the rotational speed is carried out using the second control model, provided that the calculated slippage at the point of contact with the ground lies within the corridor.

Figure 6:
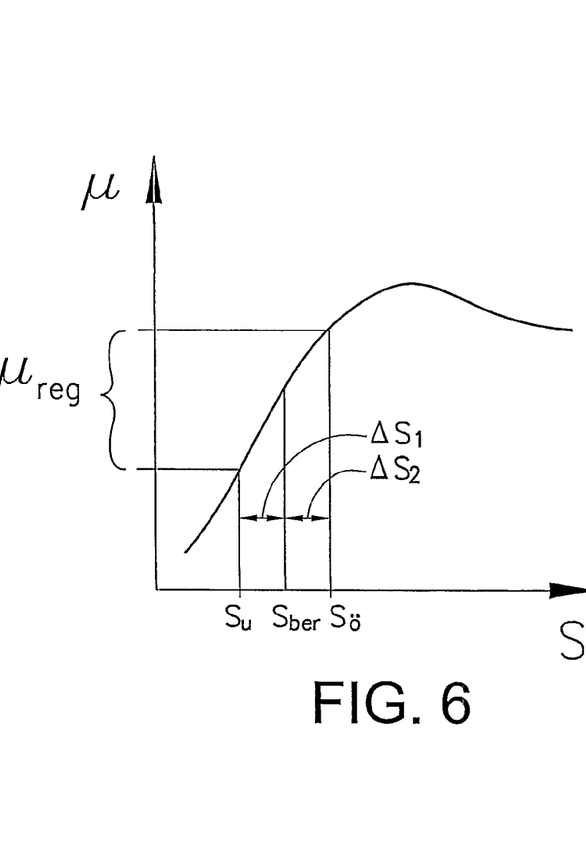
FIG. 6 shows a graph that illustrates the method for controlling the rotational speed.

FIG. 6 shows a graph that illustrates the rotational speed control method. The x-axis shows slippage (s) and the y-axis shows the friction ($\mu$) at the point of contact with the ground. A lower limit (Su) and an upper limit (Sö) are defined using the first control model for a permitted calculated slippage (Sber) for a certain steering angle. Provided that the slippage calculated using the first control model lies within these limits, the. second control model is utilized for controlling the rotational speed, that is within the range μreg.

When the second control model is utilized, the rotational speed of the longitudinal drive shaft 15 is controlled in such a way that a required torque is delivered to the front wheels 104,204 and the slippage at the said point of contact with the ground is allowed to vary. The second control model means that the said rotational speed is controlled with regard to the friction with the ground. The propulsive force is distributed in a suitable proportion to outgoing torque from the main gearbox 13 and is related to the current vertical load at the controlled point of contact with the ground. The torque ratio can thereby be changed continuously (or intermittently) and automatically in order to compensate for changed conditions.

Put simply, the theory behind the second control model (friction control) can be explained as follows:

Outgoing rotational speed from the control unit 40 affects the slippage at the point of contact with the ground of the front wheels. It determines how much friction is utilized on the basis of characteristics of the wheels and the ground upon which the vehicle is being driven. The vehicle's vertical load gives the longitudinal force and hence the torque at the output of the control unit 40. The modulated torque is compared with the torque of the control motor 42 and is adapted by changes to the rotational speed to the desired value of the outgoing torque, that is determined by the relevant conditions. The system incorporates feed-back. The regulation during controlling of the utilized friction is thus carried out with a closed system, that does not require parameter values, measurement signals and calculation algorithms to be completely correct. The risk of restricted torque is still eliminated, as the slippage is free to adapt itself to the regulated longitudinal force.

According to the method, the control with regard to friction (according to the second control model) being the determining factor is thus permitted within the limits that are determined by control of slippage (according to the first control model). This avoids problems associated with only slippage control and only friction control. The range between the limits at which the control of slippage becomes the determining factor is determined by what increase in the losses can be accepted. Quite simply, a permitted deviation is determined, measured in slippage, from the calculated ideal slippage at the contact points that are being compared.

The range of the limits can be set (for example, by the driver) in order to match the method to different ground conditions. The limits can also be changed automatically when a particular application becomes active. This means that different applications have different limits, that of course do not need to lie symmetrically around any theoretical mid position. The range of the limits ($\delta S1$ and $\delta S2$) can thus be different sizes.

The vehicle's steering angle is thus detected and is utilized in the first control model for the control of the rotational speed. In addition, in the first control model, a value is set for a permitted deviation (see $\delta s$ in FIG. 6) of the slippage from a base value, which base value is dependent upon the vehicle's steering angle ($\phi$), and the said limit is calculated as a function of the deviation value and the base value. The deviation value varies dependent upon the ground conditions. Thereafter, a value is calculated for the additional rotational speed on the basis of the detected steering deflection (the steering angle) and the deviation value.

A preferred embodiment of the second control model (friction control) is described below.

The vehicle's total driving torque M depends upon the engine torque and the gear position, both of which are available as measurement values.

The utilized friction is the quotient Fx/Fz, where Fx is propulsive force (or braking force) and Fz is the axle pressure. The energy loss in the transmission to the ground is considered to be lowest when the slippage is equal at both the relevant points of contact with the ground (in this case the point of contact of the front axle 4 with the ground in relation to the point of contact of one of the bogie axles 9,10 with the ground).

The quotient friction/slippage is dependent upon the vertical force $\mu=c*Fz*S=Fx/Fz$, where S is the slippage on a driving wheel, and c is a constant that can be varied for different surfaces upon which the vehicle is being driven.

This gives $Fx=c*S*FzA2$

The slippage, S is:

$$S=(r*w-V)/(r*w)=1-V/(r*w), \text{ where}$$

V is the speed that the front or rear axle is moving in relation to the ground. This value can be calculated when the vehicle's speed and the steering deflection (the steering angle) are known, r is the rolling radius of the wheel, and w is the wheel's rotational speed A particular utilized friction Fx/Fz thus gives different slippage at different lengths of the contact surface, here formulated as vertical force. The constant c is dependent upon the length of the contact surface and consequently varies with the air pressure. One Fz in $Fz\lambda2$ takes into account the fact that the length of the contact surface increases with increased vertical load. The other Fz simply takes into account the fact that the frictional force increases with the contact force. With the same load, wheels with lower air pressure have a longer contact surface, which increases the constant c. If the air pressure depends on the vertical force, the contact surface and hence the quotient Fx/Fz will be the same.

The torque is proportional to the tractive force and $M=M1+M2=MK1+M2/M1)$, where M is the torque from the diesel engine, M1 is the torque delivered to the front axle 4, and M2 is the torque delivered to the bogie axles Let m be $M2/M1=(c2*Fz2/(c1*Fz1))^2$ The square in the latter formula can be explained according to the following:

$$Fx/Fz=\mu=k*\text{slippage, that is;}$$

$Fx=k*Fz*\text{slippage}$. But, in addition, the value of k increases linearly with Fz, as the length of the contact surface increases linearly with Fz. Increased contact length increases μ for the same slippage.

Thus the desired value for the torque delivered to the front axle 4 is: $M1=M/(1+m)$ The tractive force on the front axle as a function of the vertical load on the same axle is thus determined in relation to the same function for other axles. Other conditions can result in the relationship between the functions being changed in other ways, which would involve a correction of the value $m=M1/M2$.

The constants c1 and c2 depend upon the air pressure in the respective tires.

The axle pressures Fzl and Fz2 can, for example, be calculated from the measured tilt angle in the longitudinal direction of the vehicle, when we know whether the machine is empty or loaded.

An actual value for the torque that is delivered to the front axle 4 is detected by the control motor 42. The torque that is delivered to the front axle 4 is controlled in such a way that the detected actual value of the torque approaches the calculated desired value M1 of the torque. More specifically, an increase in rotational speed is provided via the control motor 42 when the actual value for the torque is less than the desired value for the torque.

The second control model thus comprises a feed-back system.

If the lateral tilt angle of the respective vehicle part is measured and the wheels are controlled, it is also possible to compensate for a lateral tilt angle.

The first control model is utilized for controlling the rotational speed of the longitudinal drive shaft 15 when the second control model provides a calculated value of the said rotational speed that means that the calculated slippage according to the first control model lies outside the said limit, with the rotational speed of the rotating element being controlled in such a way that it complies with the said limit.

A preferred embodiment of the first control model (slippage control) is described below.

At a particular steering angle, the speed, V, at which the front or rear axle moves in relation to the ground is $$V1 = R1 * \psi$$

$$V2 = R2 * \psi$$

where R1 and R2 are the radii of curvature to the centres of the respective axles and the centres of the vehicle and x is the yaw angular velocity at a given steering angle. We will consider the stationary situation.

Thus, it is the case that $V1/V2 = R1/R2$

Similarly, for the inner and outer wheels of the front axle with radii of curvature RIi and R1y, $R1i = R1 - s/2$ and $R1y = R1 + s/2$ where s is the width of the track.

$$V1y/V1i = R1y/R1i$$

However, it is not sufficient to control the front wheels in relation to each other, they must also be controlled in relation to the speed of the rear axle, thus $VIy/V2 = R1y/R2$ and $VIi/V2 = R1i/R2$ We will consider the rotational speed of the drive line to the front and rear wheels at comparable gearing levels, for example input pinion, and equal axle gearing. When the rotational speed at the input to the controller for the front axle is the same as the rotational speed to the rear axle, we represent this by saying $w2 = w$. The controller on the drive line branch to the front axle adds an increase in rotational speed dw so that the outgoing rotational speed from the controller is $w1 = w + dw$. Let r1 and r2 be the rolling radii of the wheels and suppose that the gearing to the ground that we assumed to be equal to the front and rear axles is implicit, as the gearing vanishes when we consider the quotient. The respective wheel speeds are then proportional to $r1*w1$ and $r2*w2$ respectively.

The slippage, S, for the driving wheels is $$S = (r*w - V)/(r*w) = 1 - V/(r*w)$$

Thus, for the respective points of contact with the ground:

$$1 < S1 = V1/(w1*r1)$$

$$1 - S2 = V2/(w2*r2)$$

Divide and insert the speeds of the respective elements in relation to the ground according to the above $$(1-S1)/(1-S2) = (R1/R2)*(r2/r1)*(w2/w1)$$

Insert according to the above $$w2 = w$$

$$w1 = w + dw$$

from which $$(1-S1)/(1-S2) = (R1/R2)*(r2/r1)*(w/(w+dw))$$

Rearrange to $$1 + dw/w = (R1/R2)*(r2/r1)*(1-S2)/(1-S1)$$

which gives the requisite relative increase in rotational speed dw/w.

The condition for the same slippage is $$dw/w = (R1/R2)*(r2/r1) - 1$$

The slippage at the point of contact of the front axle 4 with the ground:

$$S = 1 - V/[r(w+dw)]$$

By setting a value for a permitted deviation ($\delta s$) of the slippage from the calculated slippage (Sber), that is the base value, the limit can be calculated as a function of the deviation value and the base value.

Figure 7:
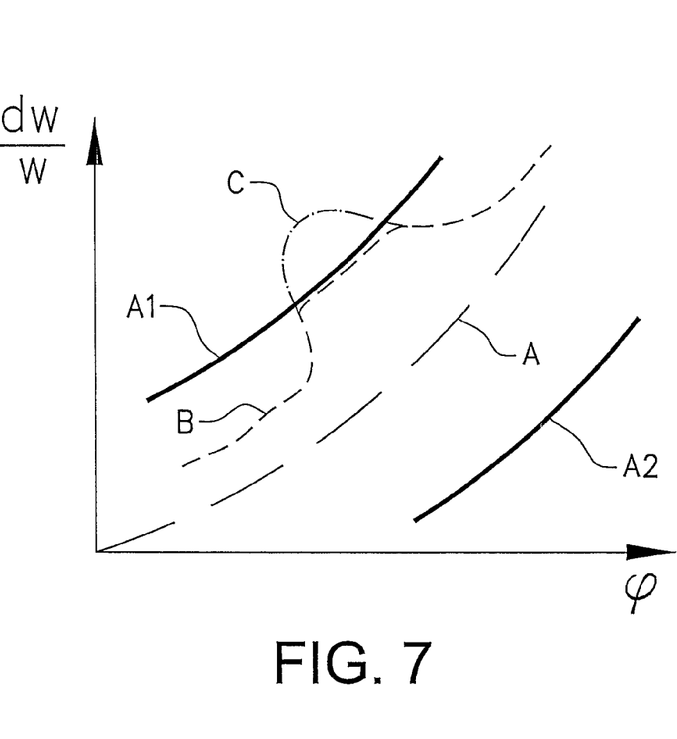
FIG. 7 illustrates schematically a possible result of the control method in a graph.

FIG. 7 illustrates schematically an example of the result of the control method in a graph where a disruption in the form of a steering angle $\phi$ is shown on the x-axis and the relative increase in rotational speed dw/w is shown on the y-axis. The curve A shows the calculated slippage and the curves A1 and A2 show the limits for permitted slippage that were calculated using the first control model. The broken line B corresponds to the increase in rotational speed that is given to the front axle 4 via the control motor 42. The dot-dashed line C corresponds to an increase in rotational speed that was calculated using the second control model (the friction control), but that lies outside the limit as defined by the curve A1.

The method is preferably a "learning" one or in other words adaptive. If there are permanent or systematic errors in either or both control systems, the friction control (the second control model) will sometimes, often or always, be in conflict with either of the limits for the slippage control (the first control model). It can result in unnecessarily large losses.

This can be eliminated by correcting the parameter values with stable deviations. The values are accumulated and processed statistically and, if the analysis shows a long-lasting discrepancy between the slippage values of the two models, one or more parameter values in one of the models is corrected so that the discrepancy is reduced.

According to an example, the time-average value and the standard deviation are measured for the position of the friction control within the limits of the slippage control when the respective application is operating. A long-lasting permanent deviation leads to the system successively adjusting a suitable constant in the application in question so that the conflict with the limits is reduced. In addition, this can be logged and sent to the supplier to enable any permanent corrections of the cause of the deviations to be carried out.

During a period of time of operation, the values for rotational speed of the rotating element calculated using the first control model are therefore saved and the first model is corrected if an average value for the values for rotational speed of the rotating element calculated using the first control model lie too close to the said limit, with the correction of the limit being carried out in such a way that the first model is activated less often.

The learning/adaptive system should also be dependent upon the application with regard to the ground conditions, etc.

In the method described above, the rotational speed control is carried out when cornering, that is a control in the horizontal plane. In the vertical plane, corresponding differences in speed arise when wheels or axles are mounted on some form of swing arm. When going over obstacles, the rotation of the swing arm when the suspension is activated will increase or decrease the rotation speed of the wheels, depending upon whether the rotation point of the swing arm lies in front of or behind the centre of the wheel. With parallelogram suspension, there is no rotation. However, other effects remain, for example increased length of the inclined part of the obstacle and the component in the longitudinal direction of the wheel's movement in the vertical direction. According to a further development of the abovementioned control method, compensating is carried out simultaneously for the speed differences in both the horizontal and vertical planes. When driving over obstacles, rotational speed is thus added or subtracted according to the method described above.

An example of correction of rotational speed with regard to the vertical plane is correction for the angles of the swing axles in a vehicle with a bogie that is being driven on uneven ground. With control units to both the axles, it is possible to make adjustments to the actual speeds. It can be expedient to select the incoming shaft to the bogie before the control unit as the reference rotational speed. This rotational speed will correspond closely to the stable speed of the vehicle.

By always correcting automatically for the speed differences that normally arise (for example, when cornering or when the suspension is activated), the drive line between the different points of contact with the ground can be linked. The difference in slippage and restricted torque are thereby both eliminated. According to the preferred example, measured signals that control the rotational speed of the control motor are the steering angle of the wheels and the driving speed in the horizontal plane and the movement of the suspension in the vertical plane, for example the angle of the swing arm or of the bogie cradle.

Figure 8:
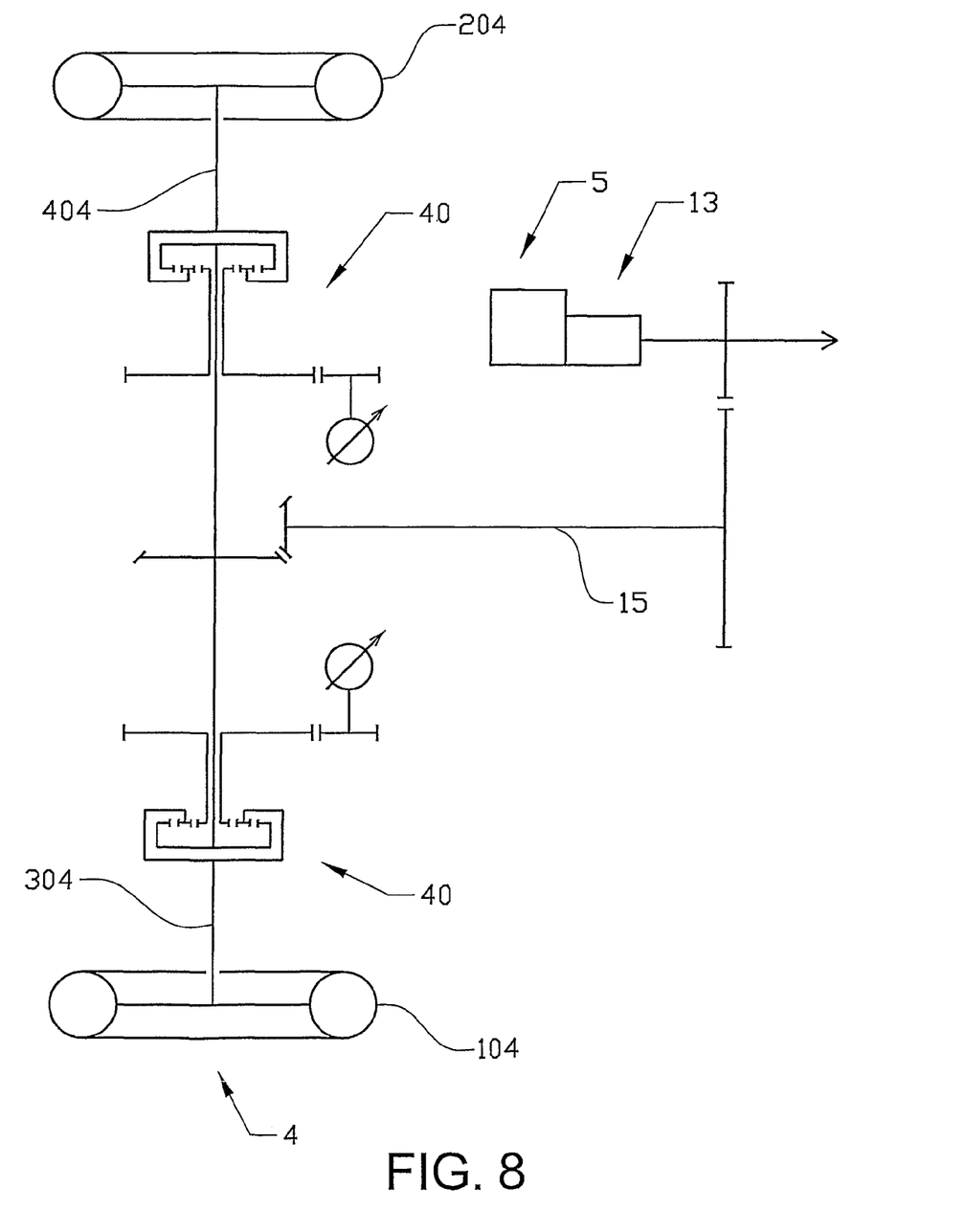
FIG. 8 shows schematically a part of the drive line of the articulated hauler, comprising a control unit for each of the right and left front wheels for controlling the rotational speed of the wheels in relation to each other.

FIG. 8 shows schematically a part of the drive line of the articulated hauler 1 according to a second preferred embodiment. The front axle 4 comprises a control unit 40 for each of the right and left front wheels 104,204 for individual control of the rotational speed that is provided to each of the wheels. The control method described above is utilized for controlling the rotational speed of the respective wheels. In this case, the rotating element that has its rotational speed controlled according to the method thus comprises a transverse drive shaft 304,404 to the left and right wheels 104,204 respectively.

Also in the embodiment according to FIG. 8, the drive line can be said to be divided into several interconnected transmission branches, of which a first transmission branch transmits tractive force to the front axle 4 and a second transmission branch transmits tractive force to the bogie axles 9,10. The control units 40 are arranged to vary the gearing in the first transmission branch and more specifically to vary the gearing to each of the front wheels 104,204.

According to an additional embodiment, several of the vehicle's driven wheel axles 4,9,10 are provided with the said control units. In other words, several of the vehicle's transmission branches are provided with the said control units. For example, each of the driven wheels can be provided with one of the said control units.

When the method is used for controlling the rotational speed for the purpose of propelling the vehicle, according to an example, it is possible to control the rotational speed in such a way that the friction and/or the slippage are essentially the same size at all the points of engagement with the ground in order to minimize losses.

When the method is used for controlling the rotational speed for the purpose of braking the vehicle, according to an example, it is possible to control the rotational speed in such a way that safety (by correction of skidding, reducing the risk of skidding, etc) and/or the vehicle's handling characteristics (cornering, oversteering/understeering, etc) are improved.

It is possible to switch between the two control models in a plurality of different ways depending upon various conditions, the said corridor being only one of many. For example, when cornering with individual control of the front wheels, it is possible to reduce the width of the corridor as the steering angle increases, so that the width of the corridor approaches zero for a large steering angle, which means that the first control model (slippage) takes over completely. This automatically provides higher propulsive force to the highly-loaded outer wheel. If we want still more propulsive force to the outer wheel, we allow the second control model to take over the control of the rotational speed again, but within the limitations that are allowed by the first control model's normal, that is wide, corridor.

The corridor condition (the maximal corridor) is always available for avoiding wheel spin. The first control model corresponds to the differential lock, in a similar way to the way that the second control model corresponds to the differential.

The invention is not to be considered to be limited to the embodiments described above, a number of additional variants and modifications being possible within the framework of the following claims.

As an alternative to utilizing the input rotational speed to the control unit 40 as the reference rotational speed, it is possible to select the rotational speed of one of the ground-engaging elements as the reference rotational speed or a common rotational speed, for example from the propulsion engine or from the gearbox or other non-controlled rotational speed in the drive line.

In addition, the drive line can also comprise power transmission by hydraulic or electrical means (in addition to mechanical power transmission). In the case of a completely hydraulic or electrical drive system, it is possible to measure outgoing rotational speed instead for the control, for example the rotational speed of the wheels, to utilize this as the reference rotational speed and to control the rotational speed ratio feed-back between, for example, front and rear wheels on a corner in such a way that, for example, the slippage is the same. In addition, with completely hydraulic or electrical driving, the control is carried out directly in the individual drive motors by the outgoing torque being measured in the motor and, by means of feedback, being adapted to the desired value that is determined by the relevant conditions.

As an alternative/supplement to utilizing the said limits (the corridor) in order to determine which control model is to be used for controlling the rotational speed, the driver can be allowed to select the control model in certain situations. In addition, the method can allow the driver to provide an additional input to detected operating parameters for the calculations in one or both control models. In addition, it is possible for additional conditions to have to be fulfilled for the selection of the control model, such as yaw angular velocity when the system is to correct a skid.

The invention can, for example, as mentioned above, be utilized with vehicles that run on rails. Vehicles that run on rails can have problems with slippage when the friction against the rails is low. Such low friction can arise when wet leaves, ice, snow, dirt or other extraneous materials are on the rails. In such cases, control of the rotational speed between the driven wheels can be utilized on the locomotive or vehicle that runs on rails.

In addition, the invention can be utilized on several vehicles that are connected together, for example a semi-trailer that has driven wheels on the—semi-trailer, or an articulated hauler with a driven bogie.

The invention claimed is:

1. A method for controlling a rotational speed of at least one rotating element in a vehicle's drive line, comprising
defining a first control model and a second control model,
calculating with the first control model a permitted slippage of at least one of the vehicle's ground-engaging elements at a point of contact of the ground-engaging element with the ground, which ground-engaging element is driven via the rotating element,
calculating with the second control model a torque delivered to the ground-engaging element, and
utilizing a result of one of the control models for controlling the rotational speed of the rotating element,
wherein the first control model calculates at least one limit for the permitted slippage and the second control model is utilized for controlling the rotational speed of the rotating element, provided that a slippage at the point of contact with the ground, calculated using the first control model, lies on the permitted side of the limit.

2. The method as claimed in claim 1, wherein the first control model is utilized for controlling the rotational speed of the rotating element when the second control model provides a calculated value of the rotational speed that means that the calculated slippage according to the first control model lies outside the limit, and the rotational speed of the rotating element is controlled in such a way that it complies with the limit.

3. The method as claimed in claim 1, wherein at least one operating parameter for the vehicle is detected repeatedly and is utilized for calculation of the limit according to the first control model.

4. The method as claimed in claim 3, wherein the vehicle's speed is detected and is utilized in the first control model.

5. The method as claimed in claim 1, wherein the values for the limit are updated repeatedly according to the first control model.

6. The method as claimed in claim 1, wherein the control of the rotational speed using the first control model is carried out in relation to a reference rotational speed that is detected in the vehicle's drive line, which reference rotational speed is associated with the rotating element that is to have its rotational speed controlled.

7. The method as claimed in claim 1, wherein the vehicle's steering angle is detected and is utilized in the first control model for controlling the rotational speed.

8. The method as claimed in claim 7, wherein a value for an increase in rotational speed to the rotating element is calculated on the basis of the detected steering angle and the deviation value according to the first control model.

9. The method as claimed in claim 1, wherein a value is set in the first control model for a permitted deviation of the slippage from a base value, which base value is dependent upon the vehicle's steering angle, and at least one limit is calculated as a function of the deviation value and the base value.

10. The method as claimed in claim 9, wherein the deviation value varies depending upon the ground conditions.

11. The method as claimed claim 1, wherein an actual value for the torque delivered to the ground-engaging element is detected, a desired value for the torque delivered to the ground-engaging element is calculated using the second control model and the torque delivered to the ground-engaging element is controlled in such a way that the actual value approaches the desired value.

12. The method as claimed in claim 11, wherein an increase in rotational speed is given to the rotating element when the actual value for the torque is less than the desired value for the torque.

13. The method as claimed in claim 11, wherein the actual value for the torque is detected by a control motor that is operationally connected to the rotating element.

14. The method as claimed in claim 11, wherein an operating parameter for the vehicle is detected and is utilized for a calculation of the desired value for the torque.

15. The method as claimed in claim 11, wherein a torque from a drive source in the vehicle is determined and is utilized in the second control model for a calculation of the desired value for the torque.

16. The method as claimed in claim 11, wherein a vertical load from the vehicle to the ground at the point of contact with the ground is determined and is utilized in the second control model for a calculation of the desired value for the torque.

17. The method as claimed in claim 11, wherein a desired propulsive force is calculated on the basis of detected operating parameters, which desired propulsive force provides a desired value for the torque.

18. The method as claimed in claim 1, wherein the second control model comprises a feed-back system.

19. The method as claimed in claim 1, wherein the control of the rotational speed between a front axle and a rear axle in the vehicle is carried out in such a way that the rotational speed of the front axle is increased in relation to the rotational speed of the rear axle when cornering.

20. The method as claimed in claim 1, wherein the control of the rotational speed between a right ground-engaging element and a left ground-engaging element is carried out in such a way that the rotational speed of the ground-engaging element with the larger radius of curvature is increased in relation to the rotational speed of the ground-engaging element with the smaller radius of curvature when cornering.

21. The method as claimed in claim 1, wherein a control unit controls the rotational speed of the rotating element in such a way that the rotational speed that is delivered to two different ground-engaging elements is varied according to the result of the control model utilized for controlling the rotational speed.

22. The method as claimed in claim 1 wherein when the second control model is utilized, the rotational speed of the rotating element is controlled in such a way that a required torque is delivered to the ground-engaging element and the slippage at the point of contact with the ground is allowed to vary.

23. The method as claimed in claim 1, wherein, when the first control model is utilized, the rotational speed of the rotating element is controlled in such a way that a free rotation of the ground-engaging element is counteracted and a torque delivered to the ground-engaging element is allowed to vary.

24. The method as claimed in claim 1, wherein the control of the rotational speed is carried out for driving of the rotating element.

25. The method as claimed in claim 1, wherein the control of the rotational speed is carried out for braking of the rotating element.

26. The method as claimed in claim 1, wherein one of the control models is selected on the basis of the vehicle's operating conditions for controlling the rotational speed of the rotating element.

27. The method as claimed in claim 1, wherein one of the control models is selected repeatedly and automatically.

28. A method for controlling a rotational speed of at least one rotating element in a vehicle's drive line, comprising defining a first control model and a second control model, calculating with the first control model a permitted slippage of at least one of the vehicle's ground-engaging elements at a point of contact of the ground-engaging element with the ground, which ground-engaging element is driven via the rotating element, calculating with the second control model a torque delivered to the ground-engaging element, and utilizing a result of one of the control models for controlling the rotational speed of the rotating element, wherein the values calculated using at least one of the first and second control models are saved during a period of operation and the models are corrected in relation to each other if they give slippage values that show long-lasting discrepancy between the models.

29. A method for controlling a rotational speed of at least one rotating element in a vehicle's drive line, comprising defining a first control model and a second control model, calculating with the first control model a permitted slippage of at least one of the vehicle's ground-engaging elements at a point of contact of the ground-engaging element with the ground, which ground-engaging element is driven via the rotating element, calculating with the second control model a torque delivered to the ground-engaging element, and utilizing a result of one of the control models for controlling the rotational speed of the rotating element, wherein the values for the rotational speed of the rotating element calculated using the first control model during a period of operation are saved and the first model is corrected if an average value or standard deviation for the values for the rotational speed of the rotating element calculated using the first control model lies too close to the limit, and the correction of the limit is carried out in such a way that the first model is activated less frequently.

\* \* \* \* \*